US012764569B2

(12) United States Patent
Cyrus et al.

(10) Patent No.: US 12,764,569 B2
(45) Date of Patent: Oct. 13, 2026

(54) MODULAR ENVIRONMENTAL MONITORING DEVICE

(71) Applicant: Lunar Outpost Inc., Golden, CO (US)

(72) Inventors: Julian Cyrus, Belvaux (LU); Justin Cyrus, Golden, CO (US); Jeffrey Stenerson, Westminster, CO (US)

(73) Assignee: Lunar Outpost Inc., Golden, CO (US)

( * ) Notice: Subject to any disclaimer, the term of this patent is extended or adjusted under 35 U.S.C. 154(b) by 445 days.

(21) Appl. No.: 18/313,744

(22) Filed: May 8, 2023

(65) Prior Publication Data

US 2023/0362688 A1 Nov. 9, 2023

Related U.S. Application Data

(60) Provisional application No. 63/364,310, filed on May 6, 2022.

(51) Int. Cl.
*H04W 24/04* (2009.01)
*H04W 4/38* (2018.01)

(52) U.S. Cl.
CPC ............. *H04W 24/04* (2013.01); *H04W 4/38* (2018.02)

(58) Field of Classification Search
CPC ..... H04W 24/04; H04W 4/38; G06F 21/6218; G06F 11/0793; G06F 11/3409
See application file for complete search history.

(56) References Cited

U.S. PATENT DOCUMENTS 8,615,374 B1 12/2013 Discenzo
10,012,766 B2 * 7/2018 Modi ....................... G01V 1/30
10,408,482 B2 * 9/2019 Ro ........................... F24F 11/58
10,957,182 B2 * 3/2021 Judice ..................... G08B 21/20
11,443,607 B2 * 9/2022 Yum ..................... G08B 21/182
2010/0265098 A1 10/2010 Zarei Seyd Abad et al.
2016/0305797 A1 10/2016 Pietrasik et al.
2019/0141472 A1 5/2019 Azevedo et al.
2020/0372777 A1 11/2020 Yum
2021/0307189 A1 9/2021 Lucero et al.

OTHER PUBLICATIONS

Extended European Search Report for EP Patent Application No. 23800291.9, Issued on Apr. 7, 2026, 9 pages.
International Search Report and Written Opinion received for PCT Patent Application No. PCT/US2023/066725, mailed on Sep. 19, 2023, 17 pages.

* cited by examiner

*Primary Examiner* — Chandrahas B Patel

(57) ABSTRACT

Aspects of the present disclosure relate to a modular environmental monitoring device. The monitoring device may include a core subassembly that provides core device functionality (e.g., data processing and communication management). A variety of modular subassemblies may be used in combination with the core subassembly, such that functionality of the monitoring device may be changed according to an environment in which the device will be used. For example, different subassemblies may offer different communication modes, such that the monitoring device may be reconfigured to use different wired and/or wireless networking technologies as are available within a given environment. Similarly, a subassembly may include a battery and/or may obtain power from any of a variety of other power sources. Additionally, the monitoring device may automatically determine which communication mode to use depending which communication modes are available, thereby offering improved reliability and reusability.

20 Claims, 8 Drawing Sheets

MODULAR ENVIRONMENTAL MONITORING DEVICE

CROSS-REFERENCE TO RELATED APPLICATION

This application claims priority to U.S. Provisional Application No. 63/364,310, titled "Modular Environmental Monitoring Device," filed on May 6, 2022, the entire disclosure of which is hereby incorporated by reference in its entirety.

BACKGROUND

In examples, a device may be configured according to one or more anticipated conditions of an environment in which the device will be used. However, actual conditions of the environment may differ from the anticipated conditions, such that the device exhibits reduced or degraded functionality as a result of such differences. Additionally, manufacturing multiple distinct devices, each for use in a different conditions, may introduce additional cost and complexity into the manufacturing process, among other detriments.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a modular environmental monitoring device. The monitoring device may include a core subassembly that provides core device functionality (e.g., data processing and communication management). A variety of modular subassemblies may be used in combination with the core subassembly, such that functionality of the monitoring device may be changed according to an environment in which the device will be used. For example, different subassemblies may offer different communication modes, such that the monitoring device may be reconfigured to use different wired and/or wireless networking technologies as are available within a given environment. Similarly, a subassembly may include a battery and/or may obtain power from any of a variety of other power sources. Additionally, the monitoring device may automatically determine which communication mode to use depending which communication modes are available, thereby offering improved reliability and reusability.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
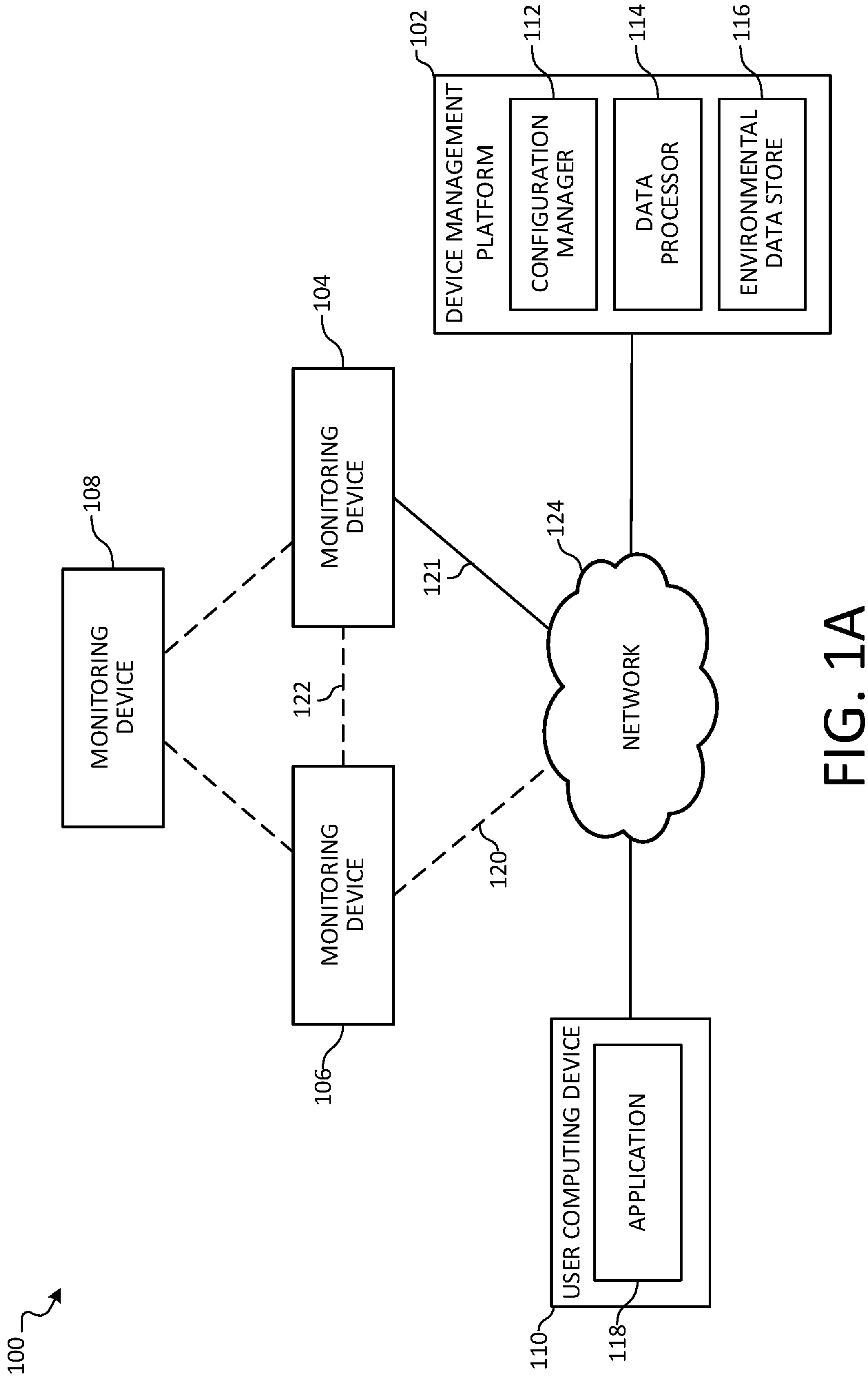
FIG. 1A illustrates an overview of an example system in which a modular environmental monitoring device may be used according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a monitoring device may obtain environmental data from one or more sensors. Example sensors include, but are not limited to, a particulate sensor (e.g., configured to identify a particulates having a predetermined size or within a predetermined range), a volatile organic compound (VOC) sensor, a speciated gas sensor (e.g., to detect one or more specific gases, such as ozone, carbon monoxide, nitrogen dioxide, carbon dioxide, hydrogen sulfide, ammonia gas, and/or nitric oxide), a temperature sensor, a black globe sensor, a humidity sensor, a pressure sensor, a precipitation sensor, a wind speed and/or direction sensor (e.g., including a sonic anemometer or multiple sensors to enable triangulation), an ultraviolet radiation sensor, a lightning strike sensor, and/or a global positioning sensor, among other examples.

As an example, the monitoring device may be placed within an environment to generate environmental data using a set of sensors, which may be stored and/or transmitted (e.g., to a remote computing device) for subsequent processing (e.g., to provide historical data, to identify trends, and/or for leak detection, among other examples). However, such a monitoring device may be preconfigured for the environment in which it will be used, such that the set of sensors, the storage local to the device, the power source, and/or the mode of communication of the monitoring device are effectively unchangeable once the device has been manufactured. This may result in reduced utility and limited serviceability, and may negatively impact the associated user experience, among other detriments.

For instance, the monitoring device may not be reusable in a different environment (e.g., once monitoring of the initial environment has been completed). As another example, a user may not be aware of the conditions associated with an environment prior to arrival at the environment and may thus realize that the substantially fixed configuration of such a monitoring device is unsuitable for the environment only after arrival at the environment. For example, a communication mode and/or power source for which the monitoring device was configured may be unreliable or otherwise unavailable.

Accordingly, aspects of the present disclosure relate to a modular environmental monitoring device (referred to hereinafter as a "monitoring device"). For example, the disclosed monitoring device may be modular with respect to an associated set of sensors, locally available storage, an associated set of communication modes, and/or an associated power source, among other examples. A core subassembly of the monitoring device, such as a main printed circuit board (PCB), may include a processor and system memory that provide "core" device functionality, such as environmental data collection and/or processing functionality, device management functionality (e.g., firmware upgrades, sensor calibration, and power management), and/or functionality associated with providing environmental data to a device management platform (e.g., device authentication, environmental data transmission, and/or telemetry data collection and transmission).

The monitoring device may be further comprised of one or more modular subassemblies, including a sensor subassembly (e.g., comprising one or more sensors), a storage subassembly (e.g., comprising storage usable by one or more other subassemblies), a power subassembly (e.g., including a power source and/or enabling connection to an external power source), and a communication subassembly (e.g., including one or more communication interfaces). In examples, a first modular subassembly may be fixably coupled to the core subassembly during manufacturing (e.g., such that it may not be easily removable by a user), while a second modular subassembly may be removably coupled for later substitution with a third modular subassembly or for serviceability. In such an example, the first modular subassembly may be disposed within a housing of the monitoring device in a way that is not easily serviceable and/or restricts access to the first modular subassembly, while the second modular subassembly may be comparatively easier to access and/or replace. For example, the second modular subassembly may be easily accessible once the housing is opened, may slot into the housing of the monitoring device (thereby electrically and/or mechanically coupling with the core subassembly), and/or may cooperate with the housing to form a seal between an interior cavity of the housing and the environment external to the monitoring device.

It will be appreciated that, in some examples, a modular subassembly may incorporate functionality and associated components of multiple such subassemblies, for example incorporating similar functionality to a sensor subassembly, a storage subassembly, a power subassembly, and/or a communication subassembly. As an example, a modular subassembly may include: a cellular and/or satellite communication interface and one or more associated antennas; a battery, battery management circuitry (e.g., to manage battery charging and discharging), and a connector usable to connect the monitoring device to a solar panel, wind turbine, or other external power source; and storage usable to store environmental data when communication with a device management platform is unavailable. In examples, multiple cellular communication interfaces may be included, as may be the case when each cellular communication interface implements a different set of frequencies and/or technologies. As another example, a modular subassembly may include: an Ethernet communication interface; circuitry operable to power the monitoring device using Power over Ethernet (PoE), as may be available via the Ethernet communication interface; and no local storage or comparatively less local storage, due to the increased reliability offered by Ethernet communication.

The core subassembly may incorporate functionality such that it need not be provided by another subassembly, such as battery management circuitry and/or storage. For example, the core subassembly may include storage on which device firmware may be stored and/or at least some environmental data may be stored (e.g., in addition to or as an alternative to storage offered by a modular subassembly). In examples, storage of the core subassembly may be used in instances where storage of a modular subassembly is unavailable (e.g., nonexistent, corrupted, or full), such that modular storage may be prioritized over storage of the core subassembly. As another example, the core subassembly may include a first set of communication interfaces (e.g., Wi-Fi, BLUETOOTH, ultra-wideband (UWB), and/or near-field communication (NFC), as may be used for device configuration and/or inter-device communication), while a modular subassembly may include a second set of communication interfaces (e.g., Ethernet, cellular, and/or satellite, as may be used for communication with a device management platform).

As a result of the modularity enabled by the use of one or more modular subassemblies in combination with a core subassembly, a user may be able to substitute a first subassembly with a second subassembly depending on the environment in which the monitoring device will be used. For example, if the user determines that cellular coverage is unstable or is unavailable, the user may substitute the first subassembly including a cellular communication interface for the second subassembly including a satellite communication interface. As another example, if the user is moving a monitoring device from a first environment in which PoE is available (e.g., that both enables communication between the monitoring device and a device management platform, and supplies power to the monitoring device) to a second environment in which wired networking and wired power is unavailable, the user may reconfigure the monitoring device to use a modular subassembly that enables wireless communication, includes a power source, and obtains power from an alternative power source (e.g., a solar panel or a wind turbine).

It will be appreciated that a modular subassembly may include multiple communication interfaces and may be usable to power a monitoring device from a variety of power sources, among other examples. For example, in instances where a monitoring device has multiple available communication modes (e.g., as a result of having multiple communication interfaces), the monitoring device may automatically or manually change between communication modes. For example, a user indication may be received (e.g., via a hardware input or via a configuration user interface) to select which communication mode is used by the monitoring device. As another example, the monitoring device may automatically determine to switch to a second communication mode when it is determined that there is an issue with a first communication mode (e.g., an unreliable connection, a slow connection, or no connection). Additional examples of such aspects are discussed below.

As noted above, a monitoring device may communicate with a device management platform. For example, the device management platform may aggregate environmental data from one or more monitoring devices, which may be processed to provide any of a variety of functionality (e.g., to provide historical data, to identify trends, and/or for leak detection, among other examples). A user may be able to view data for each sensor of a monitoring device or may be able to view aggregated processing results based on data from a plurality of sensors (e.g., of a single monitoring device and/or of multiple monitoring devices). In some instances, data from multiple sensors (e.g., of one or more monitoring devices) may be used to determine a leak type and/or triangulate a location of the leak (e.g., based on a wind speed, wind direction, and/or concentrations of one or more detected gases). The device management platform may provide a website, an application programming interface (API), and/or an associated application with which to access such data. In examples, data may be provided for display to a user substantially contemporaneously with its collection by and aggregation from a monitoring device.

The device management platform may similarly provide upgrades to a monitoring device, for example to upgrade software and/or push software patches, update one or more sensor calibrations, and/or manage telemetry data that is generated by the monitoring device. For example, a core subassembly may update its firmware or, as another example, the firmware of one or more associated modular subassemblies may similarly be updated. It will be appreciated that while examples are described herein with respect to processing performed by a monitoring device in conjunction with a device management platform, similar aspects may be performed by a monitoring device (e.g., locally) and/or in combination with any of a variety of other computing devices (e.g., a mobile computing device of a user or the user may operate a computing device that provides similar functionality as a device management platform).

FIG. 1A illustrates an overview of an example system 100 in which a modular environmental monitoring device may be used according to aspects described herein. As illustrated, system 100 includes device management platform 102, monitoring devices 104, 106, and 108, user computing device 110, and network 124. In examples, device management platform 102, monitoring devices 104, 106, and 108, and user computing device 110 communicate via network 124. For example, network 124 may comprise a local area network, a wireless network, or the Internet, or any combination thereof, among other examples.

As illustrated, monitoring device 104 communicates via network connection 121, while monitoring device 106 may communicate using network connection 120 or network connection 122. For example, network connections 120 and 121 may each be a wired or wireless connection to network 124, including, but not limited to, an Ethernet connection, a fiber connection, a Wi-Fi connection, a cellular connection, and/or a satellite connection, among other examples.

Monitoring device 106 includes multiple network connections 120 and 122, such that monitoring device 106 may dynamically change its communication mode according to aspects described herein. For example, monitoring device 106 may failover from network connection 120 to network connection 122 based on determining that network connection 120 has experienced an issue. As another example, network connection 120 may be more expensive to use as compared to network connection 122 (e.g., which may be a satellite connection and a BLUETOOTH connection, respectively), such that monitoring device 106 prioritizes communication via network connection 122 and uses network connection 120 when it is determined that network connection 122 is unavailable. Additional examples of such aspects are discussed below with respect to FIGS. 2 and 3.

In other examples, a user may configure monitoring device 106 to use network connection 120 or network connection 122, or may specify a connection hierarchy from which monitoring device 106 will automatically determine its communication mode accordingly. For example, monitoring device 106 may include a physical button, physical switch, or other hardware input with which a user may toggle between or otherwise specify a communication mode. Such a control may be provided by a modular subassembly of a monitoring device, in other examples. As another example, the user may use user computing device 110 to configure monitoring device 106 accordingly (e.g., directly or via device management platform 102).

Monitoring device 108 is illustrated as having dashed connections with both monitoring device 104 and monitoring device 106 to provide an example in which a monitoring device uses a mesh network connection to provide environmental data to one or more other monitoring devices (e.g., monitoring device 104 and monitoring device 106) and/or to communicate with device management platform 102. For example, monitoring device 108 may communicate with monitoring device 104 and/or monitoring device 106, which in turn may relay data on behalf of monitoring device 108 (e.g., via network connection 120, 121, and/or 122). For example, mesh communication may be used in instances where monitoring device 108 is positioned in a remote location that is otherwise difficult or impossible to service using another communication technology. As another example, mesh communication may be used to reduce resource utilization and/or the associated expense, such that multiple monitoring devices (e.g., monitoring devices 106 and 1080) may use a network connection of another monitoring device (e.g., monitoring device 104). Thus, it will be appreciated that a monitoring device may use any of a variety of communication technologies and associated techniques according to aspects described herein.

Device management platform 102 includes configuration manager 112, data processor 114, and environmental data store 116. In examples, configuration manager 112 manages the configuration of monitoring devices 104, 106, and 108. For example, configuration manager 112 may provide software updates, sensor calibration information, and/or configuration information (e.g., as may be based on an indication received from user computing device 110 via application 118).

Data processor 114 may process environmental data obtained from monitoring devices 104, 106, and 108. For example, each monitoring device 104, 106, and 108 may include a set of sensors that are used to obtain environmental data accordingly. As noted above, environmental data may be processed by a monitoring device (e.g., prior to transmission to device management platform 102) and/or may be processed by data processor 114 once it is aggregated from monitoring devices 104, 106, and 108. Environmental data store 116 may store aggregated and/or processed data for later retrieval. For example, data from environmental data store 116 may be used to generate a display for presentation to a user of user computing device 110 (e.g., by application 118).

User computing device 110 is illustrated as comprising application 118, which may be used to access device management platform 102 and/or to configure monitoring devices 104, 106, and 108. For example, application 118 may be a web browser application used to access a website of device management platform 102. The website may present data associated with monitoring devices 104, 106, and/or 108 (e.g., as may be accessed from environmental data store 116). As another example, application 118 may be used to configure a monitoring device, such as specifying a communication mode with which it should communicate, a set of sensors that with which environmental data should be obtained, and/or processing to be performed on the obtained environmental data, among other examples.

Figure 1B:
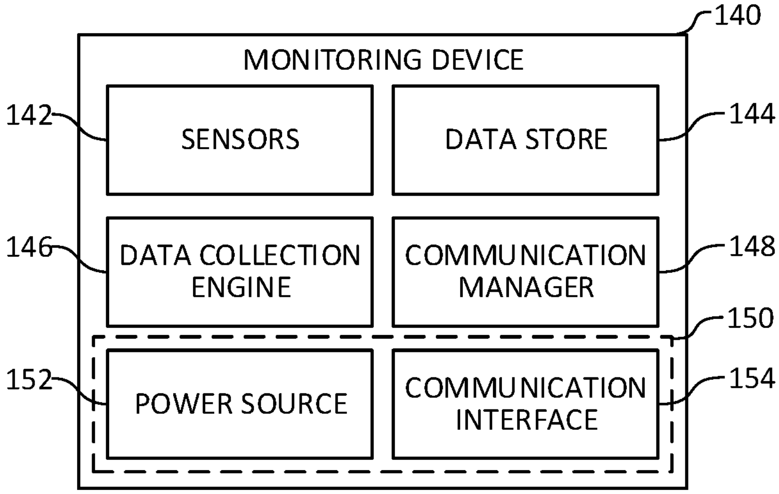
FIG. 1B illustrates a conceptual diagram of an example modular environmental monitoring device according to aspects described herein.

FIG. 1B illustrates a conceptual diagram of an example modular environmental monitoring device 140 according to aspects described herein. Aspects of monitoring device 140 may be similar to monitoring device 104, 106, and/or 108 discussed above with respect to FIG. 1A.

As illustrated, monitoring device 140 includes sensors 142, data store 144, data collection engine 146, communication manager 148, power source 152, and communication interface 154. Sensors 142 may include any of a variety of sensors, as described above. In examples, at least a subset of sensors 142 may be part of a modular subassembly according to aspects described herein, such that the sensors of 140 may be selected and/or changed depending on the environment in which monitoring device 140 is used.

Monitoring device 140 is further illustrated as comprising data store 144. Data store 144 may store firmware and/or configuration information for monitoring device 140, among other examples. In some instances, data store 144 may store environmental data collected by sensors 142, as may be the case when the environmental data cannot be communicated to a device management platform (e.g., device management platform 102) or when environmental data is stored and transmitted to the device management platform in batches. In examples, at least a part of the storage of monitoring device 140 is provided as part of a modular subassembly, as discussed above.

Data collection engine 146 may obtain environmental data from sensors 142 (e.g., according to firmware and/or configuration information stored by data store 144). Data collection engine 146 stores the data in data store 144 and/or transmits the data to a device management platform, among other examples. In examples, data collection engine 146 processes the environmental data prior to storage and/or transmission. Data collection engine 146 may be part of a core subassembly of monitoring device 140.

Monitoring device 140 further comprises communication manager 148. Communication manager 148 may manage communication between monitoring device 140 and a device management platform, such as device management platform 102. Similarly, communication manager 148 may manage communication between monitoring device 140 and one or more other monitoring devices, as may be the case when mesh networking is used and/or when environmental data from multiple monitoring devices is obtained and processed by data collection engine 146, among other examples.

Communication manager 148 may manage a set of communication interfaces of monitoring device 140 (e.g., communication interface 154). Thus, communication manager 148 may dynamically determine a configuration mode of monitoring device 140 and/or may process a manual communication mode selection received from a user according to aspects described herein. In examples, communication manager 148 is part of a core subassembly of monitoring device 140. In other examples, at least a part of the functionality of communication manager 148 may be provided by a modular subassembly.

In examples, power source 152 includes a battery or other power storage device in addition to or as an alternative to an interface usable to couple monitoring device 140 to a power source accordingly. For example, power source 152 may include a connector with which a solar panel or wind turbine may be electrically coupled to monitoring device 140. As another example, power source 152 may include a cable with which monitoring device 140 may be electrically coupled to a power gride. As a further example, power source 152 may supply power via induction or other wireless power transfer technology, such that a battery or other power source may be charged and/or monitoring device 140 may be powered accordingly. It will thus be appreciated that any of a variety of power sources may be used according to aspects described herein. In examples, power source 152 utilizes a connector of communication interface 154, as may be the case when communication interface 154 includes an Ethernet connection that supports PoE.

Communication interface 154 may implement any of a variety of communication technologies according to aspects described herein. For example, communication interface 154 may use wired and/or wireless communication technologies. As noted above, communication interface 154 may be managed by communication manager 148. While monitoring device 140 is illustrated as including a single communication interface 154, it will be appreciated that any number of communication interfaces may be used in other examples. In some instances, a core subassembly includes a first set of communication interfaces (not pictured), while a modular subassembly includes a second set of communication interfaces (e.g., including communication interface 154).

While a core subassembly may include functionality similar to power source 152 and/or communication interface 154, the dashed box is provided to illustrate an example modular subassembly 150 that includes power source 152 and communication interface 154. Thus, modular subassembly 150 of monitoring device 140 may be substituted for any of a variety of other modular subassemblies (e.g., offering a different power configuration and/or a different set of communication interfaces). It will be appreciated that, in other examples, modular subassembly 150 may further comprise one or more sensors 142 and/or at least a part of the storage provided by data store 144. While examples are described in which alternate subassemblies are used, it will be appreciated that, in other examples, subassemblies may be additive such that a first modular subassembly may be operably coupled to a second modular subassembly (or a core subassembly may be operably coupled to both modular subassemblies) and functionality from both modular subassemblies may be used accordingly.

Figure 1D:
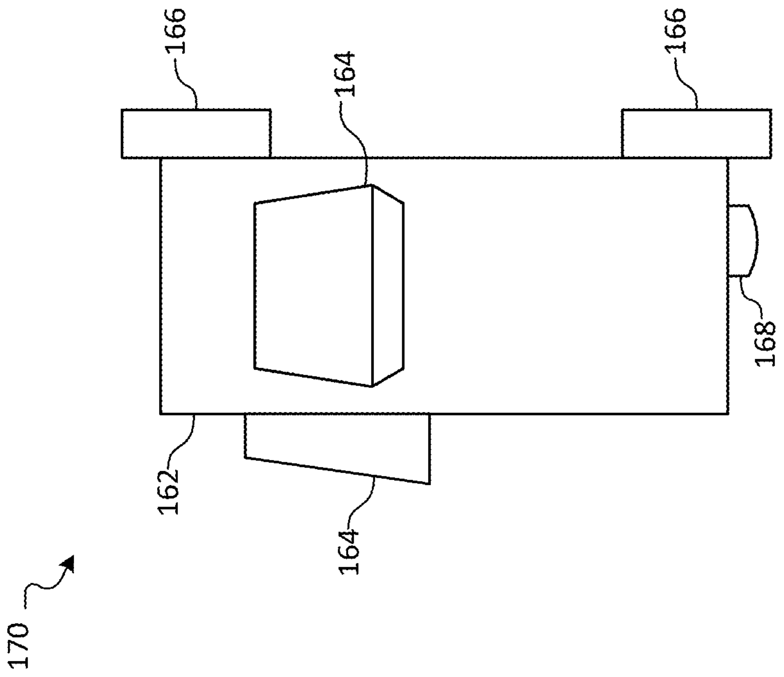
FIG. 1D illustrates a side view of an example modular environmental monitoring device.
Figure 1C:
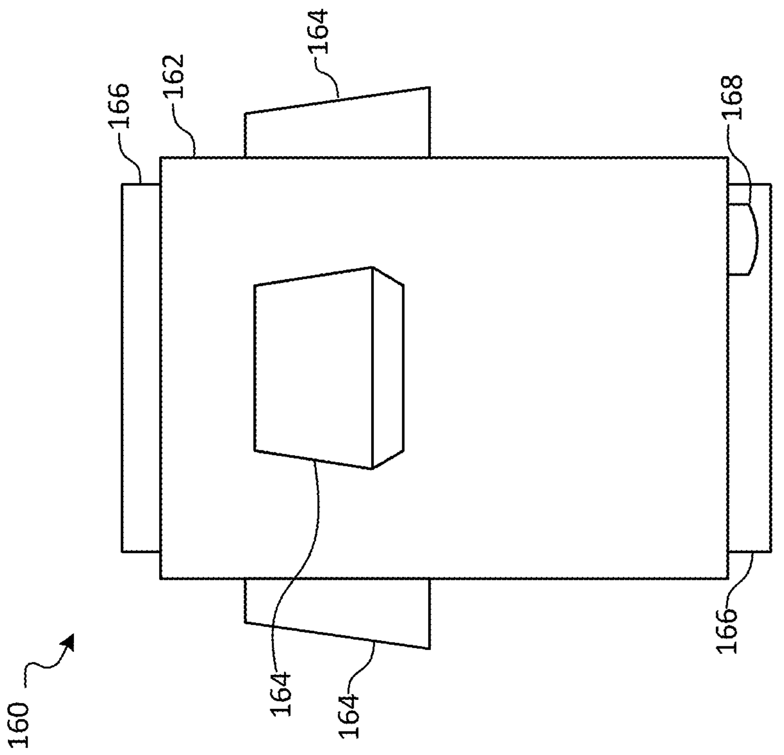
FIG. 1C illustrates a front view of an example modular environmental monitoring device.
Figure 1E:
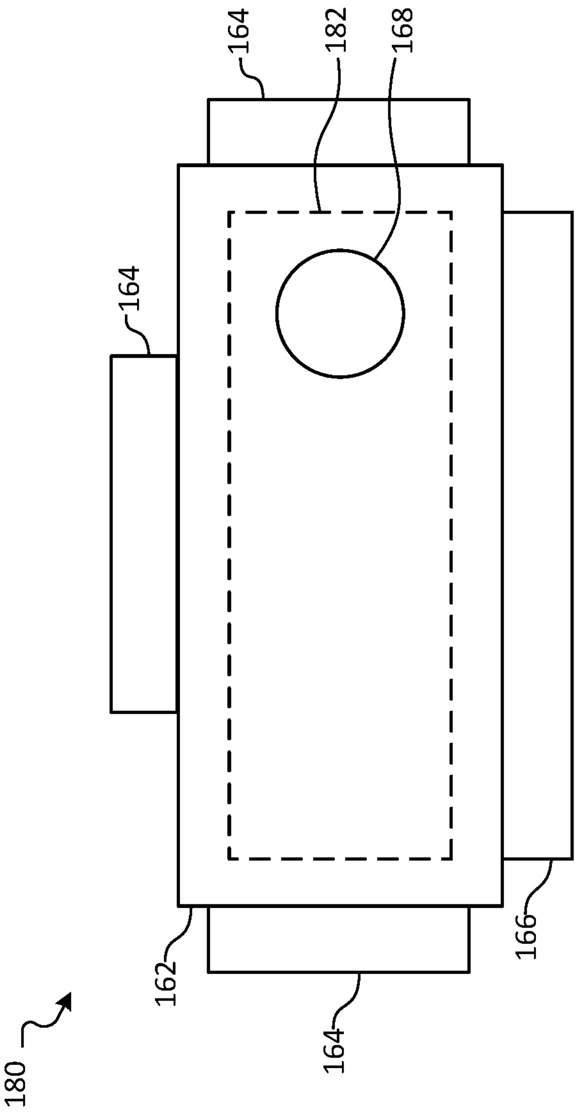
FIG. 1E illustrates a bottom view of an example modular environmental monitoring device.

FIGS. 1C-1E illustrate views 160, 170, and 180 of an example modular environmental monitoring device 162 according to aspects described herein. Aspects of monitoring device 162 may be similar to those discussed above with respect to monitoring devices 104, 106, 108, and/or 140 of FIGS. 1A and 1B, and are therefore not necessarily redescribed below.

As illustrated, monitoring device 162 includes shrouds 164, mount 166, and connector 168. For example, shrouds 164 may provide airflow to one or more sensors of monitoring device 162 while protecting the interior of monitoring device 162 from various environmental conditions (e.g., dust, sun exposure, and/or water). Mount 166 may enable monitoring device 162 to be mounted in any of a variety of locations, including, but not limited to, on the side of a building, on a pole, or on a tripod. In examples, mount 166 may be removably coupled to monitoring device 162, such that it may be exchanged for a different mount (not pictured) depending on how the monitoring device is to be mounted.

Connector 168 may be used to provide a power and/or network connection to monitoring device 162. In examples, connector 168 is an Ethernet receptacle that may be used to obtain power via PoE and establish communication with a device management platform (e.g., device management platform 102 of FIG. 1A). As another example, monitoring device 162 may include a wireless communication interface, such that connector 168 may be used to electrically couple monitoring device 162 to a solar panel or wind turbine, among other examples. In some instances, depending on the subassemblies contained within monitoring device 162, connector 168 may be removed, closed or otherwise shielded when it is not in use.

With reference specifically to FIG. 1E, modular subassembly 182 is illustrated using a dashed box to indicate that, in some examples, modular subassembly 182 may form at least a part of the housing of monitoring device 162. Accordingly, substituting subassembly 182 for a different subassembly (not pictured) may yield a configuration in which a different set of connectors are provided (e.g., in addition to or as an alternative to connector 168) or may yield a configuration in which the bottom of monitoring device 162 does not have any connectors. In other examples, a modular subassembly may be entirely inside the housing of monitoring device 162, such that a set of connectors of the monitoring device are retained and, in examples, used by subassemblies of the monitoring device accordingly. In another example, a combination of fixed connectors and removable connectors (e.g., coupled to a modular subassembly) may be used.

In some examples, a material of a monitoring device housing and/or of an external portion of a modular subassembly may be selected for radio transparency (e.g., for cellular or satellite communication) or may be selected according to the communication interface(s) and/or power source(s) supplied by the modular subassembly. As another example, a monitoring device may include a set of antennas (e.g., configured in a way to improve radio transmissibility through the housing of the monitoring device) that may be electrically coupled to a communication interface of a modular subassembly accordingly.

In other examples, aspects of the present disclosure may be used to provide a retrofit kit for existing monitoring devices having a fixed set of capabilities, such that a modular subassembly may be used to extend such an otherwise fixed set of capabilities. The retrofit kit may include a different housing for the existing monitoring device or may include modifications to be made to the existing monitoring device accordingly.

Figure 2:
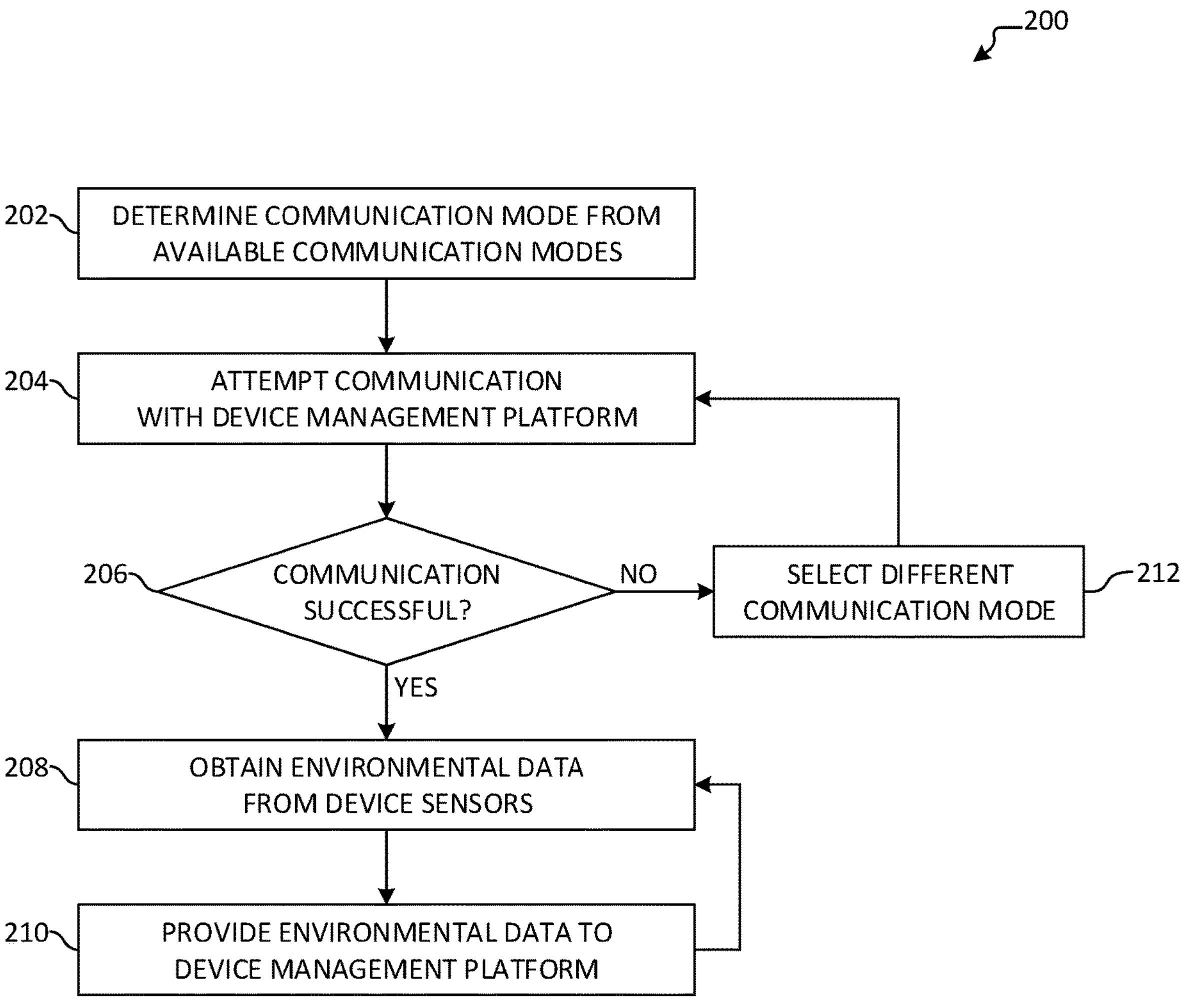
FIG. 2 illustrates an overview of an example method for determining a communication mode with which to communicate with a device management platform to provide environmental data accordingly.

FIG. 2 illustrates an overview of an example method 200 for determining a communication mode with which to communicate with a device management platform to provide environmental data accordingly. In examples, aspects of method 200 are performed by a communication manager, such as communication manager 148 discussed above with respect to FIG. 1B.

For example, aspects of method 200 may be performed when it is determined that the monitoring device has been moved to a new location (e.g., as a result of identifying a changed set of coordinates from a global positioning sensor of the monitoring device). As another example, aspects of method 200 may be performed in response to receiving a request from a user (e.g., as may be received via a hardware input of the monitoring device or via a mobile computing device, among other examples).

Method 200 begins at operation 202, where a communication mode is determined from a set of available communication modes. For example, operation 202 may comprise evaluating a hardware configuration of the monitoring device to determine a set of available communication modes. In some instances, operation 202 includes determining whether available communication interfaces have been configured. For example, the monitoring device may include a satellite or cellular communication interface, but the interface may not have been configured (e.g., with an associated service plan or subscriber identity module (SIM) card).

The communication mode may be determined from the set of available communication modes using any of a variety of techniques. For example, operation 202 may comprise processing a user selection of specific communication mode or determining which communication mode should be used based on a user-configured hierarchy of communication modes. As another example, the communication mode may be determined based on an associated estimated cost, such that the communication mode may be selected as a result of determining that the communication mode has the lowest estimated cost as compared to the other available communication modes.

At operation 204, communication is attempted with a device management platform (e.g., device management platform 102 in FIG. 1A). In examples, the attempted communication includes a "ping" with which the monitoring device checks in with the device management platform, for example to provide telemetry data or to determine whether any updates (e.g., for firmware, configuration, and/or sensor calibration) are available. In another example, the attempted communication includes environmental data that was obtained using a set of sensors of the monitoring device.

Flow progresses to determination 206, where it is determined whether the communication was successful. Determination 206 may include determining whether any communication was established with the device management platform or whether the communication is reliable (e.g., having a percentage of dropped packets and/or a latency below a predetermined threshold).

If it is determined that the communication was not successful, flow branches "NO" to operation 212, where a different communication mode is selected. Aspects of operation 212 may be similar to those discussed above with respect to operation 202 and are therefore not necessarily redescribed. For example, operation 212 may comprise selecting the next communication mode based on a hierarchy or based on an associated cost, among other examples. Flow then returns to operation 204, where communication with the device management platform is attempted using the different communication mode that was selected at operation 212. Flow thus loops between operation 204, 206, and 212 until a successful communication mode is determined.

Returning to determination 206, if it is instead determined that communication was successful, flow branches "YES" to operation 208, where environmental data is obtained from the set of sensors of the monitoring device (e.g., as may be performed by a data collection engine, such as data collection engine 146 discussed above with respect to FIG. 1B). In examples, operation 208 further comprises processing at least a part of the environmental data and/or storing the environmental data in a data store (e.g., data store 144).

Flow progresses to determination 210, where the environmental data is provided to the device management platform using the communication mode that was determined as a result of performing operations 202, 204, 206, and 212. While method 200 is described as an example in which environmental data is provided after communication is established, it will be appreciated that any of a variety of alternative or additional actions may be performed. Method 200 terminates at operation 210.

Figure 3:
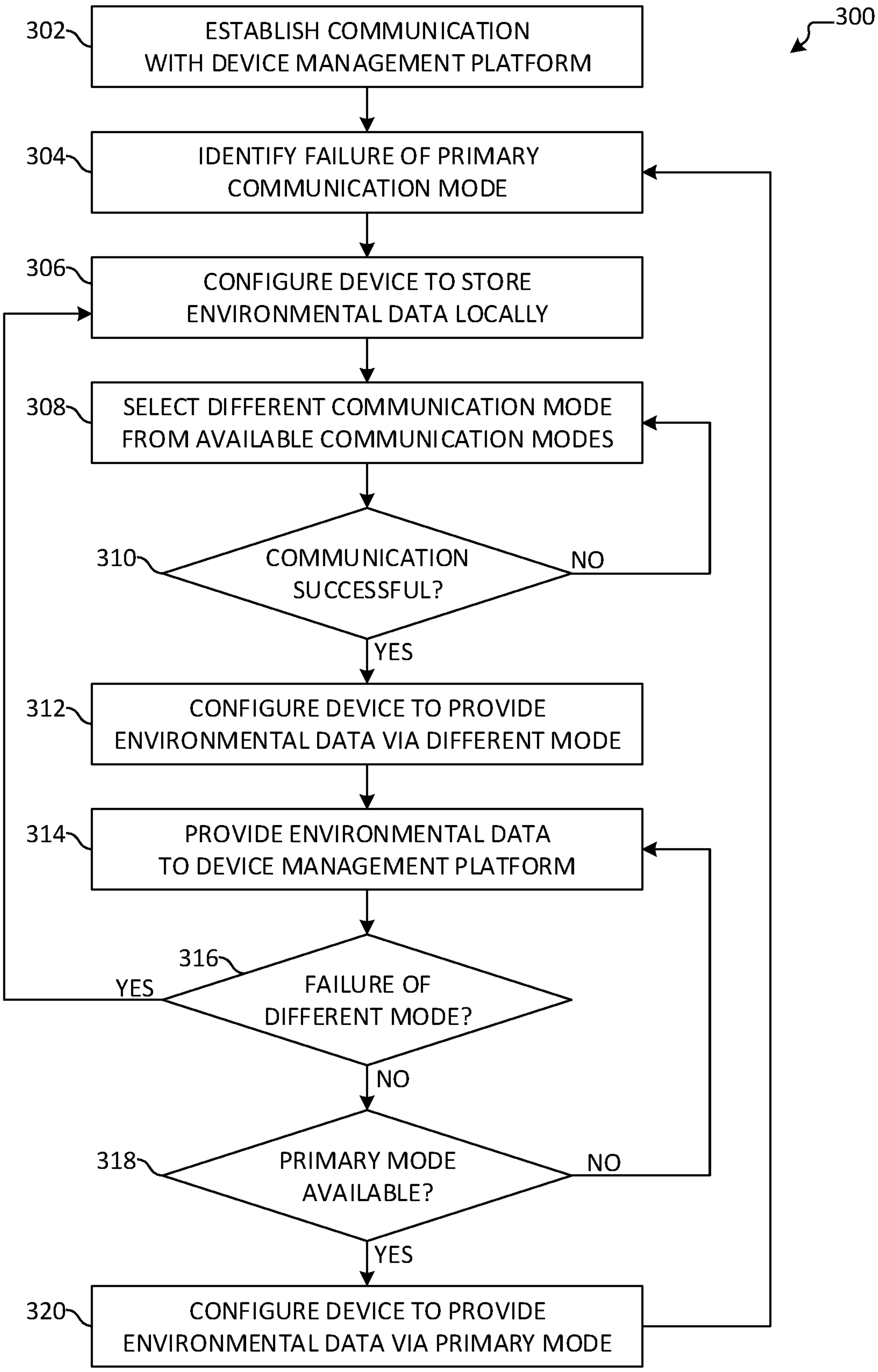
FIG. 3 illustrates an overview of an example method for identifying and remediating a communication failure with a device management platform.

FIG. 3 illustrates an overview of an example method 300 for identifying and remediating a communication failure with a device management platform. In examples, aspects of method 300 are performed by a communication manager, such as communication manager 148 discussed above with respect to FIG. 1B.

Method 300 begins at operation 302, where communication with a device management platform is established. Aspect of operation 302 may be similar to those discussed above with respect to method 200 of FIG. 2. For example, a communication mode may be selected from a set of available communication modes and used to communicate with the device management platform accordingly. The selected communication mode may be referred to as a primary communication mode in the context of method 300.

At operation 304, a failure of the primary communication mode is identified. It will be appreciated that any of a variety of failures may occur, including, but not limited to, a failure of a communication interface, a loss of signal or decreased signal strength (e.g., as a result of an obstacle), a failure by a communication provider (e.g., an Internet service provider, a cellular network provider, or a satellite provider), and/or a failure associated with a device management platform.

Accordingly, at operation 306, the monitoring device is configured to store environmental data locally. For example, the environmental data may be stored in a data store similar to data store 144 discussed above with respect to FIG. 1B.

Flow progresses to operation 308, where a different communication mode is selected from the set of available communication modes. Aspects of operation 308 may be similar to those discussed above with respect to operation 202 of method 200 in FIG. 2 and are therefore not necessarily redescribed. For example, operation 308 may comprise selecting the next communication mode based on a hierarchy or based on an associated cost, among other examples.

The selected communication mode may be evaluated at operation 308 (e.g., by attempting to establish communication with the device management platform), such that it may be determined at determination 310 whether communication via the selected communication mode was successful. Thus, flow branches "NO" and loops between operations 308 and 310 (e.g., retrying communication modes of the set of available communication modes) while communication with the device management platform is unsuccessful.

Eventually, flow branches "YES" to operation 312, where the monitoring device is configured to provide environmental data via the different mode that was determined as a result of performing operations 308 and 310. For example, the monitoring device may be configured to provide environmental data to the device management platform rather than storing the data in the data store (e.g., as was configured at operation 306). In other examples, the monitoring device may be configured to provide a part of the environmental data via the different communication mode, as may be the case when the different communication mode has a higher associated cost than the primary communication mode. Accordingly, at operation 314, the environmental data is provided to the device management platform. In examples, operation 314 comprises providing data from the data store to the device management platform.

At determination 316, it is determined whether there has been a failure of the different communication mode, in which case flow branches "YES" and returns to operation 306, such that environmental data is once again stored locally and a different communication mode is identified and used accordingly (e.g., as a result of performing operations 308-314). If, however, a failure has not occurred, flow branches "NO" to determination 318, where it is determined whether the primary communication mode is once again available. If the primary communication mode is not available, flow branches "NO" and returns to operation 314, such that a different communication mode is used to provide environmental data to the device management platform in instances where the primary mode is unavailable.

By contrast, if it is instead determined that the primary mode is once again available, flow branches "YES" to operation 320, where the monitoring device is configured to provide the environmental data via the primary mode. For example, the different communication mode may be deactivated and communication with the device management platform may be reestablished using the primary communication mode. Method 300 may terminate at operation 320 or, in other examples, flow may eventually return to operation 304 when a subsequent failure is identified.

Figure 4:
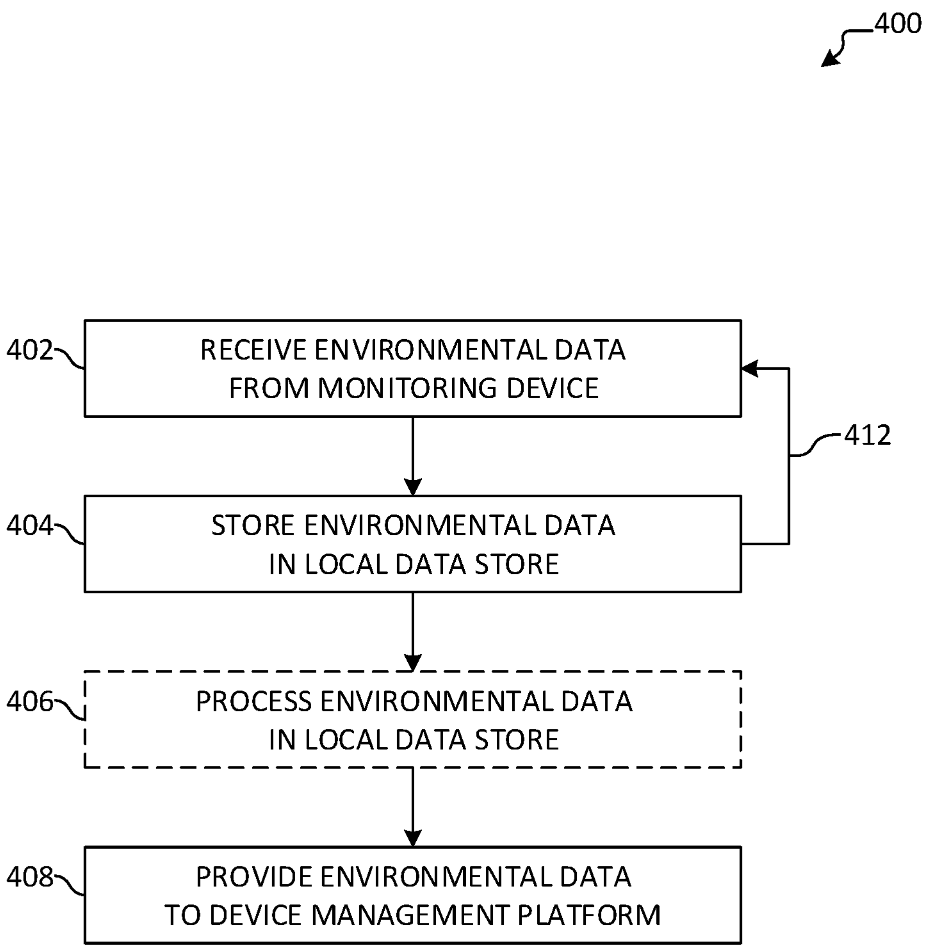
FIG. 4 illustrates an overview of an example method for aggregating data by a mesh monitoring device and providing the aggregated data to a device management platform accordingly.

FIG. 4 illustrates an overview of an example method 400 for aggregating data by a mesh monitoring device and providing the aggregated data to a device management platform accordingly. In examples, aspects of method 400 are performed by a monitoring device that is part of a mesh network of one or more other monitoring devices. For example, method 400 may be performed by monitoring device 104 discussed above with respect to FIG. 1A.

Method 400 begins at operation 402, where environmental data is received from a monitoring device. For example, the environmental data may be received from the monitoring device using Wi-Fi, BLUETOOTH, or any of a variety of other communication technologies. Further, it will be appreciated that, in other examples, at least a part of a mesh network may include wired communication.

At operation 404, the environmental data is stored in a local data store (e.g., data store 144 in FIG. 1B). In some examples, the configuration of a monitoring device may vary according to its anticipated role within a given environment. For example, a monitoring device that is anticipated to act as a hub of a mesh network (e.g., in addition to or as compared to a relay node) may be configured to have a larger amount of local storage as compared to an edge node of the mesh network. Arrow 412 is illustrated from operation 404 to operation 402 to illustrate that, in some examples, operations 402 and 404 may be performed multiple times before method 400 advances to operations 406-408. For example, a monitoring device may aggregate environmental data from multiple monitoring devices as a result of performing operations 402-404 and/or may aggregate multiple samples of environmental data for a given time period.

Eventually, method 400 may progress to operation 406, where environmental data of the local data store is processed. For example, the environmental data may be processed to compress the environmental data, to generate a set of summary statistics, and/or identify one or more trends. It will thus be appreciated that any of a variety of processing may be performed at operation 406. Operation 406 is illustrated using a dashed box to indicate that, in other examples, operation 406 may be omitted. For example, environmental data may not be processed prior to transmission in some examples.

At operation 408, the environmental data is provided to a device management platform (e.g., device management platform 102 in FIG. 1A). In some instances, processed data (e.g., as may have been generated at operation 406) may be provided in addition to or as an alternative to at least a part of the environmental data. In some instances, the environmental data provided to device management platform 408 includes data received at operation 402 as well as data that was generated by the monitoring device performing aspects of method 400. Method 400 terminates at operation 408.

Figure 5:
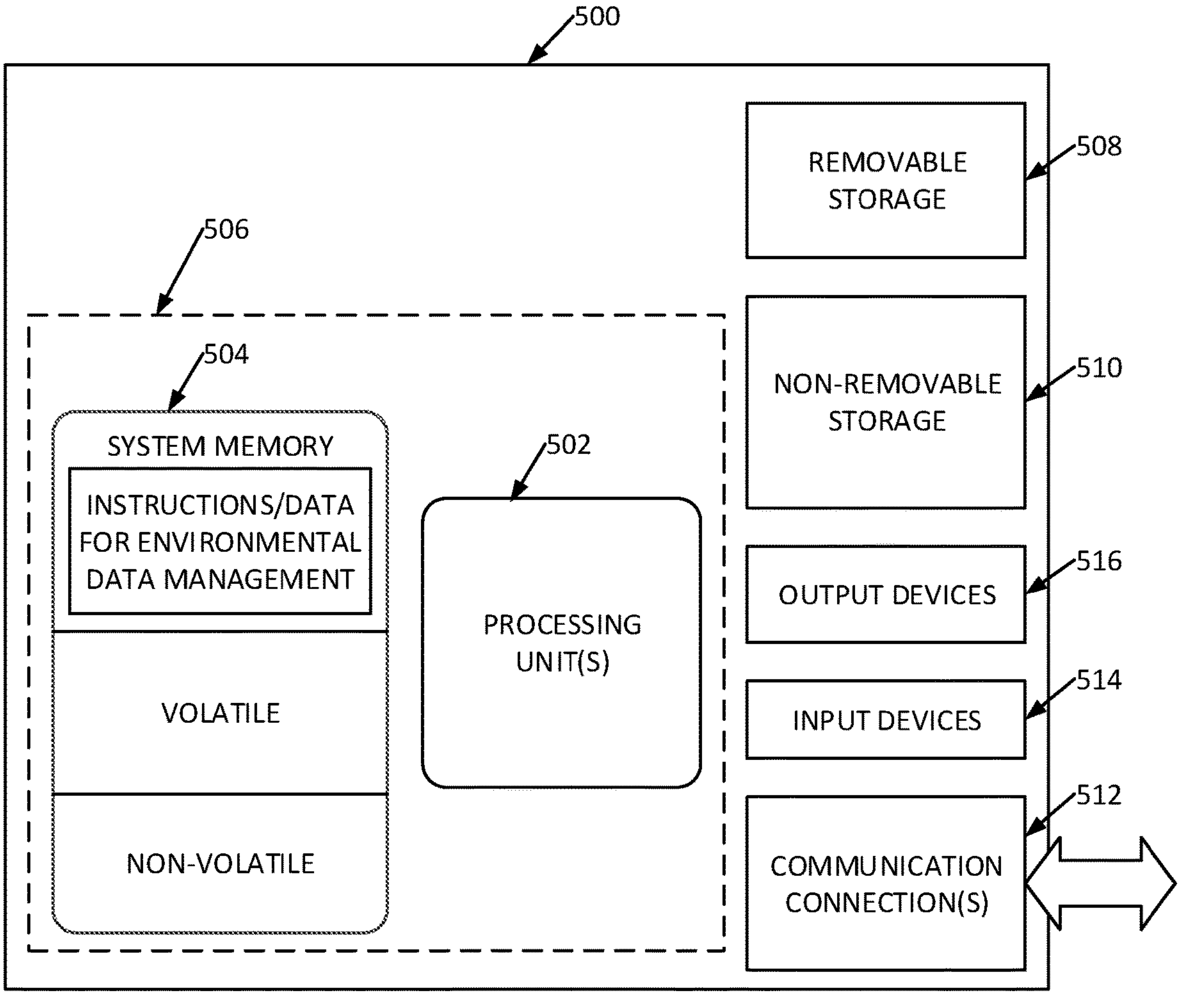
FIG. 5 illustrates an example of a suitable operating environment in which one or more aspects of the present application may be implemented.

FIG. 5 illustrates an example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein such as the methods illustrated in FIG. 2, 3, or 4, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a modular environmental monitoring device, comprising a core subassembly configured to electrically couple with a modular subassembly. The core subassembly includes: at least one processor; and a memory storing instructions that, when executed by the at least one processor, cause the system to perform a set of operations, the set of operations comprising: determining a communication mode from a set of available communication modes associated with the modular subassembly; obtaining environmental data from a sensor of the modular environmental monitoring device; and providing an indication of the environmental data to a device management platform via the determined communication mode. In an example, the modular subassembly includes at least one communication interface selected from the group of communication interfaces consisting of: an Ethernet communication interface, wherein the Ethernet communication interface includes Power over Ethernet functionality; a cellular communication interface; and a satellite communication interface. In another example, the modular subassembly further comprises a battery and a connector to couple the modular environmental monitoring device to an external power source. In a further example, the set of operations further comprises: identifying a communication failure; and in response to identifying the communication failure, performing at least one of: storing environmental data using local storage of the modular environmental monitoring device; or determining another communication mode from the set of available communication modes and using the another communication mode to provide a subsequent indication of environmental data from the sensor of the modular environmental monitoring device. In yet another example, the core subassembly is further configured to electrically couple with a sensor subassembly that includes the sensor. In a further still example, the core subassembly further comprises the sensor. In another example, the core subassembly is further configured to receive power from the modular subassembly.

In another aspect, the technology relates to a method for managing communication of a modular environmental monitoring device. The method comprises: determining a first communication mode from a set of available communication modes for the modular environmental monitoring device; obtaining environmental data from a sensor of the modular environmental monitoring device; providing, via the first communication mode, an indication of the environmental data to a device management platform; identifying a communication failure for the first communication mode; and in response to identifying the communication failure: determining a second communication mode from the set of available communication modes; and providing, using the second communication mode, a subsequent indication of environmental data from the sensor of the modular environmental monitoring device. In an example, the method further comprises, in response to identifying the communication failure for the first communication mode, storing environmental data from the sensor using local storage of the modular environmental monitoring device. In another example, an indication of the stored environmental data is provided, from the local storage via the second communication mode, to the device management platform after the second communication mode is determined from the set of available communication modes. In a further example, the method further comprises: determining the first communication mode is available; and in response to determining the first communication mode is available, providing, using the first communication mode instead of the second communication mode, a subsequent indication of environmental data from the sensor of the modular environmental monitoring device. In yet another example, the method further comprises: identifying a communication failure for the second communication mode; and in response to identifying the communication failure for the second communication mode: determining a third communication mode from the set of available communication modes, wherein the third communication mode is different than the first communication mode and the second communication mode; and providing, using the third communication mode, a subsequent indication of environmental data from the sensor of the modular environmental monitoring device. In a further still example, the set of available communication modes includes one or more of Ethernet, cellular communication, or satellite communication.

In a further aspect, the technology relates to a system, comprising: at least one processor; and a memory storing instructions that, when executed by the at least one processor, cause the system to perform a set of operations. The set of operations comprises: determining a communication mode from a set of available communication modes associated with a modular subassembly that is communicatively coupled to the system; obtaining environmental data from a sensor; and providing, via the determined communication mode of the modular subassembly, an indication of the environmental data to a device management platform. In an example, the modular subassembly includes at least one communication interface selected from the group of communication interfaces consisting of: an Ethernet communication interface, wherein the Ethernet communication interface includes Power over Ethernet functionality; a cellular communication interface; and a satellite communication interface. In another example, the modular subassembly further comprises a battery and a connector to couple the system to an external power source. In a further example, the set of operations further comprises: identifying a communication failure; and in response to identifying the communication failure, performing at least one of: storing, in local storage, environmental data from the sensor; or determining another communication mode from the set of available communication modes and using the another communication mode to provide a subsequent indication of environmental data from the sensor. In yet another example, the system is configured to communicatively couple with a sensor subassembly that includes the sensor. In a further still example, the system further comprises the sensor. In another example, the system is further configured to receive power via the modular subassembly.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A modular environmental monitoring device, comprising:

a core subassembly configured to electrically couple with a modular subassembly, the core subassembly including:

at least one processor; and a memory storing instructions that, when executed by the at least one processor, cause the system to perform a set of operations, the set of operations comprising:

determining a communication mode from a set of available communication modes associated with the modular subassembly;

obtaining environmental data from a sensor of the modular environmental monitoring device;

providing an indication of the environmental data to a device management platform via the determined communication mode;

identifying a communication failure; and in response to identifying the communication failure, performing at least one of:

storing environmental data using local storage of the modular environmental monitoring device; or determining another communication mode from the set of available communication modes and using the another communication mode to provide a subsequent indication of environmental data from the sensor of the modular environmental monitoring device.

2. The modular environmental monitoring device of claim 1, wherein the modular subassembly comprises at least one of:

an Ethernet communication interface, wherein the Ethernet communication interface includes Power over Ethernet functionality;

a cellular communication interface; or a satellite communication interface.

3. The modular environmental monitoring device of claim 1, wherein the modular subassembly further comprises a battery and a connector to couple the modular environmental monitoring device to an external power source.

4. The modular environmental monitoring device of claim 1, wherein the sensor comprises at least one of a particulate sensor, a volatile organic compound sensor, a speciated gas sensor, a temperature sensor, a black globe sensor, a humidity sensor, a pressure sensor, a precipitation sensor, a wind sensor, an ultraviolet radiation sensor, a lightning strike sensor, or a global positioning sensor.

5. The modular environmental monitoring device of claim 1, wherein the core subassembly is further configured to electrically couple with a sensor subassembly that includes the sensor.

6. The modular environmental monitoring device of claim 1, wherein the core subassembly further comprises the sensor.

7. The modular environmental monitoring device of claim 1, wherein the core subassembly is further configured to receive power from the modular subassembly.

8. A method for managing communication of a modular environmental monitoring device, the method comprising:

determining a first communication mode from a set of available communication modes for the modular environmental monitoring device;

obtaining environmental data from a sensor of the modular environmental monitoring device;

providing, via the first communication mode, an indication of the environmental data to a device management platform;

identifying a communication failure for the first communication mode; and in response to identifying the communication failure:

determining a second communication mode from the set of available communication modes; and providing, using the second communication mode, a subsequent indication of environmental data from the sensor of the modular environmental monitoring device.

9. The method of claim 8, further comprising, in response to identifying the communication failure for the first communication mode, storing environmental data from the sensor using local storage of the modular environmental monitoring device.

10. The method of claim 9, wherein an indication of the stored environmental data is provided, from the local storage via the second communication mode, to the device management platform after the second communication mode is determined from the set of available communication modes.

11. The method of claim 8, further comprising:

determining the first communication mode is available; and in response to determining the first communication mode is available, providing, using the first communication mode instead of the second communication mode, a subsequent indication of environmental data from the sensor of the modular environmental monitoring device.

12. The method of claim 8, further comprising:

identifying a communication failure for the second communication mode; and in response to identifying the communication failure for the second communication mode:

determining a third communication mode from the set of available communication modes, wherein the third communication mode is different than the first communication mode and the second communication mode; and providing, using the third communication mode, a subsequent indication of environmental data from the sensor of the modular environmental monitoring device.

13. The method of claim 8, wherein the set of available communication modes includes one or more of Ethernet, cellular communication, or satellite communication.

14. A system, comprising:

at least one processor; and a memory storing instructions that, when executed by the at least one processor, cause the system to perform a set of operations, the set of operations comprising:

determining a communication mode from a set of available communication modes associated with a modular subassembly that is communicatively coupled to the system;

obtaining environmental data from a sensor;

providing, via the determined communication mode of the modular subassembly, an indication of the environmental data to a device management platform identifying a communication failure; and in response to identifying the communication failure, performing at least one of:

storing, in local storage, environmental data from the sensor; or determining another communication mode from the set of available communication modes and using the another communication mode to provide a subsequent indication of environmental data from the sensor.

15. The system of claim 14, wherein the modular subassembly comprises at least one of:

an Ethernet communication interface, wherein the Ethernet communication interface includes Power over Ethernet functionality;

a cellular communication interface; or a satellite communication interface.

16. The system device of claim 14, wherein the modular subassembly further comprises a battery and a connector to couple the system to an external power source.

17. The system of claim 14, wherein the sensor comprises at least one of a particulate sensor, a volatile organic compound sensor, a speciated gas sensor, a temperature sensor, a black globe sensor, a humidity sensor, a pressure sensor, a precipitation sensor, a wind sensor, an ultraviolet radiation sensor, a lightning strike sensor, or a global positioning sensor.

18. The system of claim 14, wherein the system is configured to communicatively couple with a sensor subassembly that includes the sensor.

19. The system of claim 14, further comprising the sensor.

20. The system of claim 14, wherein the system is further configured to receive power via the modular subassembly.

* * * * *